Feb. 6, 1951   F. GANTNER ET AL   2,540,198
DIFFERENTIAL TYPE SETTING MEANS
Original Filed Feb. 10, 1942   2 Sheets-Sheet 1
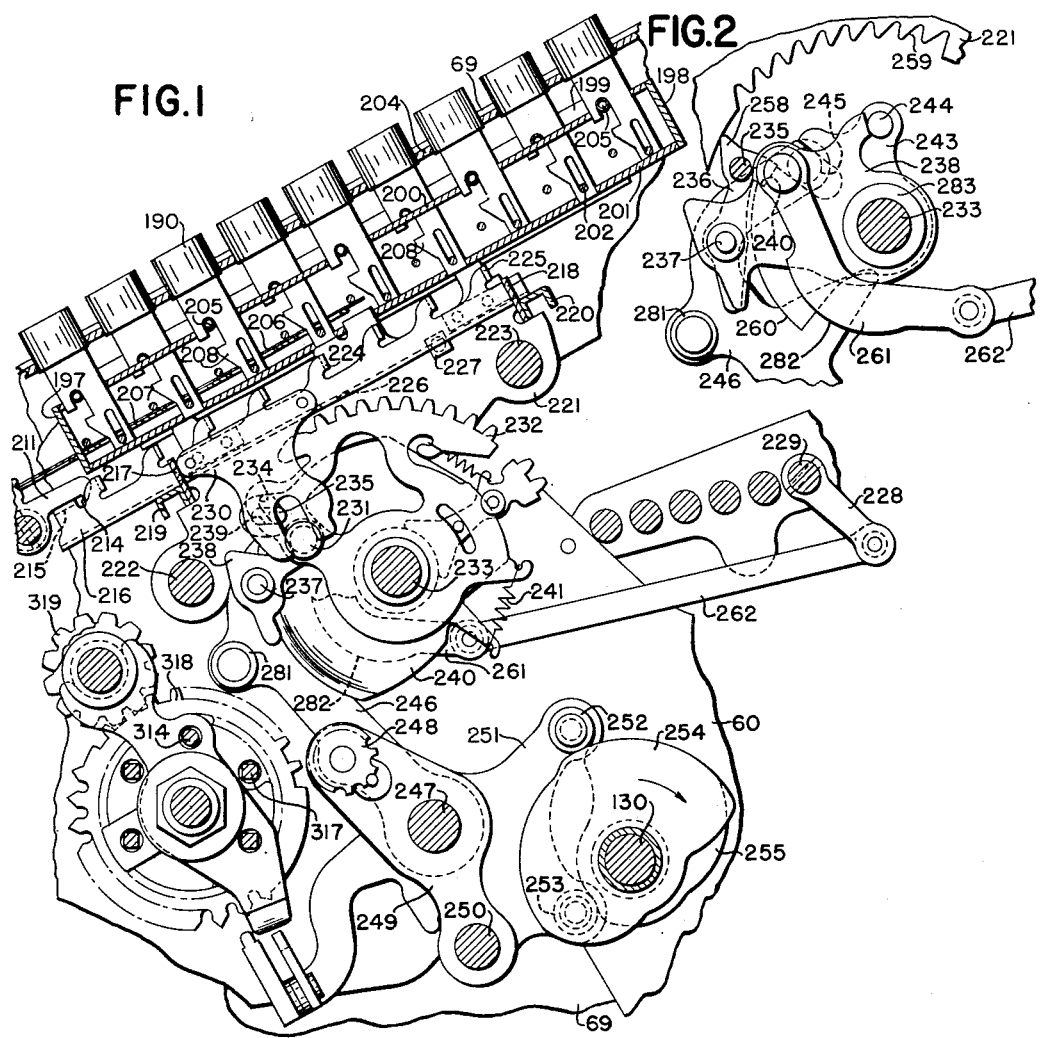
FREDERICK GANTNER
JOSEPH J. KLOSTERMAN, DEC'D
BY MARY KLOSTERMAN
   EXECUTRIX
AND JOHN B. GEERS, DECEASED
BY JOHN H. MORE
   ADMINISTRATOR
         INVENTORS
BY  *Earl Beust*
   THEIR ATTORNEY Feb. 6, 1951     F. GANTNER ET AL     2,540,198
DIFFERENTIAL TYPE SETTING MEANS
Original Filed Feb. 10, 1942     2 Sheets-Sheet 2

FREDERICK GANTNER
JOSEPH J. KLOSTERMAN, DEC'D
BY MARY KLOSTERMAN
    EXECUTRIX
AND JOHN B. GEERS, DECEASED
BY JOHN H. MORE
    ADMINISRATOR
           INVENTORS
BY
*Earl Beust*
THEIR ATTORNEY

Patented Feb. 6, 1951

2,540,198

UNITED STATES PATENT OFFICE 2,540,198

DIFFERENTIAL TYPE SETTING MEANS

Frederick Gantner, Dayton, Ohio, Joseph J. Klosterman, deceased, late of Dayton, Ohio, by Mary Klosterman, executrix, Dayton, Ohio, and John B. Geers, deceased, late of Dayton, Ohio, by John H. More, administrator, Cincinnati, Ohio, assignors to The National Cash Register Company, Dayton, Ohio, a corporation of Maryland Original application February 10, 1942, Serial No. 430,214. Divided and this application March 22, 1946, Serial No. 656,326

6 Claims. (Cl. 101—93)

The present invention relates to combined cash registers and adding machines and is particularly directed to improvements in the type of machine disclosed in United States Patent No. 2,286,116, issued June 9, 1942, to B. M. Shipley, and is a division of the United States application of E. J. Carey and J. B. Geers, deceased, Serial Number 430,214, filed February 10, 1942, now Patent Number 2,443,652, issued June 22, 1948.

The principal object of this invention is to provide novel means to control the printing of zeros when printing amounts and identifying numbers.

A more specific object is to prevent or eliminate the printing of zeros to the left of the highest significant digit in connection with amounts and identifying numbers, and at the same time permit the printing of zeros to the right of the highest significant digit in all denominations where an amount key or an identifying number key has not been operated to control the printing in its respective denominations.

With these and incidental objects in view the invention includes certain novel features of construction and combinations of parts, the essential elements of which are set forth in appended claims and a preferred form or embodiment of which is hereinafter described with reference to the drawings which accompany and form a part of this specification.

In the drawings:

Fig. 1 is a sectional view of the machine taken just to the right of the $10.00 amount bank, showing said amount bank, the differential mechanism and the printing mechanism associated therewith. This $10.00 bank mechanism is identical with the ten-cent bank mechanism shown in the parent case above mentioned.

Fig. 2 is a detail view of the differential latch for the $10.00 amount bank.

Fig. 3 is a diagrammatic view showing a portion of the keyboard and includes five banks of amount keys and four banks of identifying number keys.

GENERAL DESCRIPTION

Figure 4:
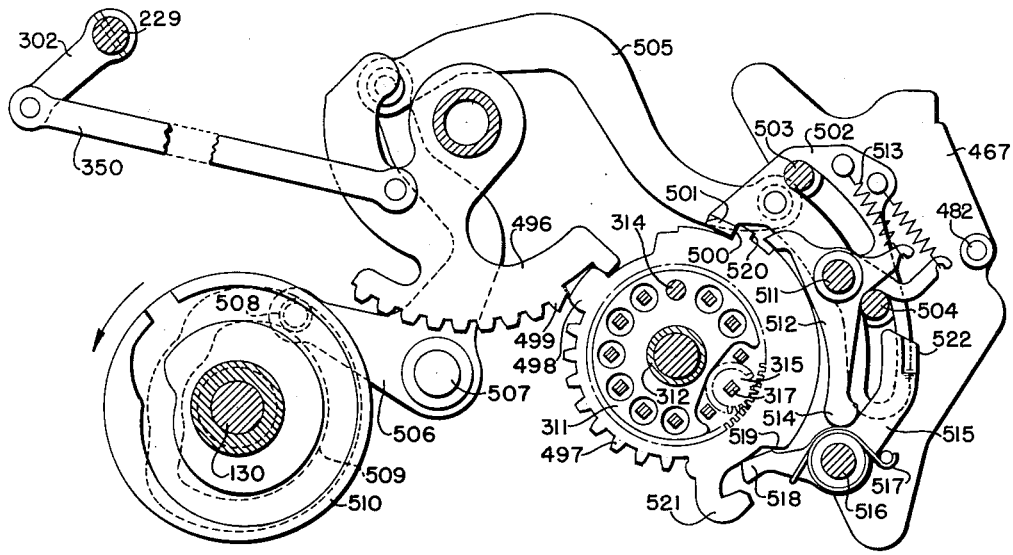
Fig. 4 is a left side elevation of the mechanism for controlling the printing of zeros in one of the amount banks.

The present invention is directed to a small, compact, efficient and readily portable combined cash register and adding machine, and particularly is it directed to the control of the printing in such machines, which machines are adapted for use in such business concerns as filling stations, beauty shops, dry cleaning establishments, drug stores, etc.

As presently constructed, the machine embodying this invention has five rows of adding or amount keys and four rows of ledger or number identifying printing keys. There are also control keys which are not shown in the present divisional application.

When the machine is used as a cash register the fifth or highest order of amount keys is locked against depression and only the four lower order rows of amount keys may be used for registering amounts, thus providing a maximum registering capacity of $99.99. When the machine is used as an adding machine, the fifth row of amount keys is unlocked, thus giving the keyboard a capacity of $999.99.

The differential mechanism for the five rows of adding or amount keys, in addition to controlling the positioning of their corresponding totalizer wheels (not shown in this divisional application), also controls the positioning of corresponding type wheels for printing records upon record material. There is also a differential mechanism associated with each row of the identifying number keys, which differential mechanisms are substantially the same as the amount differential mechanisms. There are also corresponding type wheels associated with these four rows of identifying number keys.

Associated with the differentials in the printing mechanism are zero printing control mechanisms to control the printing of zeros in connection with the printing of amounts and also in connection with the printing of identifying numbers.

The zero printing control mechanism for the identifying control numbers is exactly the same as that which is associated with the amount keys.

DETAILED DESCRIPTION

MACHINE FRAMEWORK

The mechanism of the machine is supported by two main frames (only one of which is shown in this divisional application). This frame 60 is partly shown in Fig. 1. The mechanism of the machine is enclosed in a suitable cabinet 69, a portion of which is also shown in Fig. 1.

OPERATING MECHANISM

Under normal conditions, a conventional type of electric motor (not shown in this application)

drives the main shaft 130 one complete clockwise revolution for each operation of the machine.

KEYBOARD

The keyboard of the present machine comprises four rows of amount keys 190 (Figs. 1 and 3) giving a maximum registering capacity of $99.99; and one row of adding keys 191, used in conjunction with the amount keys 190 when the machine is used as an adding machine to increase the capacity of the keyboard to $999.99 as above mentioned.

There are also four rows of identifying number printing keys 192 used in conjunction with the keys 190 and 191 for printing identifying numbers.

The keys 190, 191 and 192 inclusive are not assembled in individual banks as is the usual custom, but instead all keys are assembled in a single framework, a portion of which is shown in Fig. 1, which framework is removable from the machine as a single unit. This has been fully illustrated and described in the above mentioned parent application Serial No. 430,214. This type of keyboard construction makes for simplicity and compactness and has all the advantages of the individual bank construction without any of the disadvantages. For example, the keyboard capacity of the machine may be varied to suit the different requirements. This is likewise true of the printing keys 192.

The single unit keyboard framework comprises front and back frames 197 and 198 (Fig. 1) a partition plate 199 for each row of keys, one of said partition plates also being at each end of the framework, an upper support plate 200 and a lower support plate 201. All of the above plates are secured together by means of tenon and slot connections and by means of small tie rods 202 which pass through holes in the partition plates 199 and are flattened on each end to secure them in place.

Amount keys

Inasmuch as the key mechanism and the associated differential mechanism are substantially duplicated for each row of amount keys, it is believed that a description of the $10.00 denomination of amount keys shown in Fig. 1 will suffice for all.

Keys 190 for the $10.00 amount bank are depressibly supported in slots in the plates 200 and 201 and are retained against removal by means of slots therein in cooperation with the corresponding ones of the rods 202. Each of the amount keys is normally retained in undepressed position by a coil spring 205 which extends horizontally through the entire keyboard assembly, there being one such spring for all keys of like numerical order, said springs adapted to be engaged by notches in the keys of like order. The springs 205 rest on the top surface of the keyboard plate 200, and when a key is depressed said spring is forced or tensioned downwardly through an opening in said plate adjacent the key stem and when said key is released the spring 205 returns it upwardly to undepressed position as herein shown.

This type of keyboard spring construction is fully disclosed in the United States Patent No. 2,210,099, issued August 6, 1940, to B. M. Shipley, to which reference may be had for a more detailed description of the keyboard spring construction.

Each of the rows of amount keys has a detent 206 for locking the keys in depressed position and a control detent 207 for releasing zero stop pawls 211 so that the differential mechanisms may move away from zero positions and be positioned by the depressed amount keys 190.

Depression of any one of the $10.00 amount keys 190 causes an angular camming surface on a projection 208 thereof, in cooperation with the forward edge of a corresponding slot in the detent 206, to shift said detent forwardly or to the left, as viewed in Fig. 1, against the action of a spring (not shown herein) until said projection passes beneath said detent whereupon said spring returns the detent rearwardly to lock the depressed key 190 in depressed position. The amount keys are of flexible construction wherein the depression of a key releases a previously depressed key in the same denominational order.

The control plate 207 lies directly beneath the detent 206 and depression of any one of the amount keys 190 causes the camming surface of the projection 208 thereon, in cooperation with the edge of a corresponding slot in the plate 207, to shift the plate forwardly and retain said plate in its forward position while said key is depressed. The forward end of the plate 207 underlies a rounded nose on the zero stop pawl 211 and consequently the forward movement of the plate 207, when an amount key is depressed, rocks the pawl 211 counterclockwise against the action of a spring, not shown in this divisional application.

Such counterclockwise movement of the zero stop pawl 211 rocks a tooth 214 thereon out of the path of a bent-over ear 215 on a differential slide 216, shiftably supported in a framework comprising front and back members 217 and 218 secured respectively to inverted U bars 219 and 220, in turn secured to partition plates 221 for each order. These partition plates in turn are mounted on rods 222 and 223 supported by the machine side frames.

There is one of the differential slides 216 for each denominational order of amount keys and one for each row of the identifying number keys 192. The differential slide 216 has four upward projections, having ears 224 bent toward the left, said ears being adapted to cooperate with the odd numbered keys 1, 3, 5 and 7, and said slide likewise has four similar projections with ears 225 bent toward the right and arranged to cooperate with the even numbered keys 2, 4, 6 and 8. The stems of the nine amount keys 190 are staggered, the odd numbered keys being toward the left and the even numbered keys toward the right.

Depression of any one of the keys 190, except the 9 key, moves the stem thereof into the path of the corresponding ear 224 or 225 and simultaneously moves the zero stop pawl 211 out of the path of the ear 215 as previously explained. Initial movement rearwardly of the differential slide 216 under influence of the amount differential mechanism to be later described causes the ear 224 or 225 to engage the lower forward end of the stem of the depressed key 290 to position the slide 216 and the corresponding differential mechanism in proportion to the value of the depressed amount key 190. When the 9 key is depressed the slide travels full distance rearwardly to the 9 position, which is determined by a projection 226 thereon coming in contact with a square stud 227 in the left-hand partition plate 221 for this particular denomination.

The slide 216 is connected to and positions a corresponding differential mechanism in accordance therewith, which differential mechanism operates totalizers, as illustrated and described in the parent application, and also sets printing wheels to be hereinafter described in this divisional application.

AMOUNT DIFFERENTIAL MECHANISM

The differential positioning of the slide 216 is transmitted to the differential mechanism by means of an arm 230 (Fig. 1) secured thereto, said arm having a slot which engages a stud 231 in a differential segment 232, free on a rod 233 supported by the machine side frames. The segment 232 has an angular slot 234 through which extends a stud 235 in a differential latch 236 (Fig. 2) free on a stud 237 carried by a latch plate 238 free on the rod 233. The stud 235 also extends through a slot 239 (Fig. 1) in a latch control plate 240 free on the rod 233, said slot 239 being angularly opposed to the slot 234. A spring 241 urges the segment 232 clockwise and the plate 240 counterclockwise, creating a scissors action between the slots 234 and 239 and the stud 235 to normally retain the latch 236 in its clockwise position in which position a projection on said latch engages a shoulder 242 on the periphery of a segment 243, also free on the rod 233.

When the latch 236 is in engagement with the shoulder 242 an extension on the plate 238 engages a stud 244 in the segment 243 to form a driving connection between said segment and said plate. The differential drive segment 243 has a slot therein which engages a stud 245 in a differential drive arm 246 free on a rod 247 supported by the machine side frame. An eccentric 248 (Fig. 1) adjustably connects the arm 246 to a (Fig. 1) adjustably connects the arm 246 to a companion arm 249 also free on the rod 247 and said arm 249 and similar arms for the other differential mechanisms are connected by a rod 250 to a differential cam arm 251, also free on the rod 247. The cam arm 251 carries rollers 252 and 253, which cooperate, respectively, with the peripheries of companion plate cams 254 and 255 secured to the main shaft 130. The arm 251 is located on the left-hand end of the rod 247 and supports the left-hand end of the rod 250, while a similar arm (not shown) is located near the right end of said rod 247 and supports the righthand end of the rod 250 and carries rollers which cooperate with companion plate cams (not shown) but identical with the cams 254 and 255. The rod 250 forms an operating connection between the arms 249 for the differential mechanisms of the amount keys 190 and 191 and the identifying number printer keys 192, and the cam arms 251.

As previously explained, the main shaft 130 makes one complete clockwise revolution during each machine operation. When the machine is in home position the slide 216 is retained one step beyond zero as shown in Fig. 1, for the purpose of effecting transfers in the totalizers which are not shown in this application but which are shown and described in the parent application mentioned before. At the beginning of the machine operation the cams 254 and 255, through the connections here shown, rock the arm 246 a slight distance clockwise to move the segment 243 clockwise in unison therewith, which movement is transmitted by the latch 236 to the plate 238. The stud 235 carried by the latch 236 in cooperation with the slots 234 and 239 in the differential segment 232 and the latch control plate 240 carries said parts clockwise in unison therewith. Clockwise movement of the differential segment 232 causes the stud 231 in cooperation with the slot in the arm 230 to shift the slide 216 rearwardly, to the right as viewed in Fig. 1, from home position to zero position. While the slide 216 is retained in zero position the transfer mechanism for this denominational order is restored to untripped position in case it was tripped in the preceding operation, as is fully illustrated and described in the above mentioned parent application.

After the transfer mechanism has been restored, if a key 190 has been depressed, the segment 232 and slide 216 continue their initial movement under influence of the cams 254 and 255 until one of the bent-over ears 224 or 225 comes into contact with the lower end of the stem of the depressed key 190, or in the case of the 9 key being depressed, the slide is arrested by the stud 227. This obstructs further movement, rearwardly, of the slide 216 and positions the segment 232 in accordance with the value of the depressed amount key 190. Stopping the segment 232 causes the stud 235 to ride up the inclined surface of the slot 234 against the action of the slot 239 and the spring 241 to disengage the latch 236 from the shoulder 242 (Fig. 2) of the driving segment 243 and simultaneously to engage a tooth 258 on said latch with the corresponding one of a series of alining notches 259 in an arcuate surface of the plate 221, these notches 259 corresponding to the different positions of the slide 216 and the segment 232. Such disengaging of the latch 236 disconnects the latch plate 238 from the drive segment 243 to position the differential mechanism in accordance with the value of the depressed amount key 190, said segment 243 being free to complete its initial movement clockwise. When the latch 236 (Fig. 2) is disengaged from the shoulder 242, as explained above, and engaged with the corresponding alining notch 259, an arcuate surface 260 on the segment 243 passes beneath the extension of said latch to lock said latch and the differential mechanism in set position.

The upper end of a beam 261 (Figs. 1 and 2) is pivotally connected to the latch plate 238 and when the arm 246 nears the terminus of its initial movement clockwise a roller 281 carried thereby engages an arcuate surface 282 on the forward edge of said beam 261 and forces a curved surface on the inside edge of said beam into engagement with the periphery of a hub 283 free on the rod 233 to position said beam 261 in accordance with the value of the depressed amount key 190.

The differential positioning of the beam 261 is transmitted to the printing mechanism in the following manner:

The beam 261 is connected by a link 262 to an arm 228 secured to a shaft 229 supported by the machine framework. This shaft 229 therefore receives the differential movement under control of the depressed key in the amount bank being described, which in this particular instance is the $10.00 amount bank. Also secured to the shaft 229 is an arm 302 (Fig. 4) connected by a link 350 to a segment 496, which segment meshes with the external teeth of an internal-external gear 497, the internal teeth of which bear on the periphery of a disk 311 free on a bushing 312. A locating rod 314 which passes through the entire type wheel gear assembly is a slip fit in the locating hole in the disk 311 and locates said disk 311 so that a cut-away or clearance portion thereof is opposite a pinion 315 which meshes with the internal teeth of the gear 497. The pinion 315 is rotatably supported by tenons on each side thereof, in cooperation with borings in separating plates supported by the bushing 312 and the rod 314 in exactly the same manner as the disk 311. A square hole in the pinion 315 freely engages a square shaft 317 and the shaft likewise freely engages another pinion similar to the pinion 315 which meshes with the internal teeth of an internal-external gear 318 (Figs. 1 and 5) similar to the gear 497, the external teeth on the gear 318 meshing with and driving a type wheel 319 for the $10.00 denomination.

Figure 5:
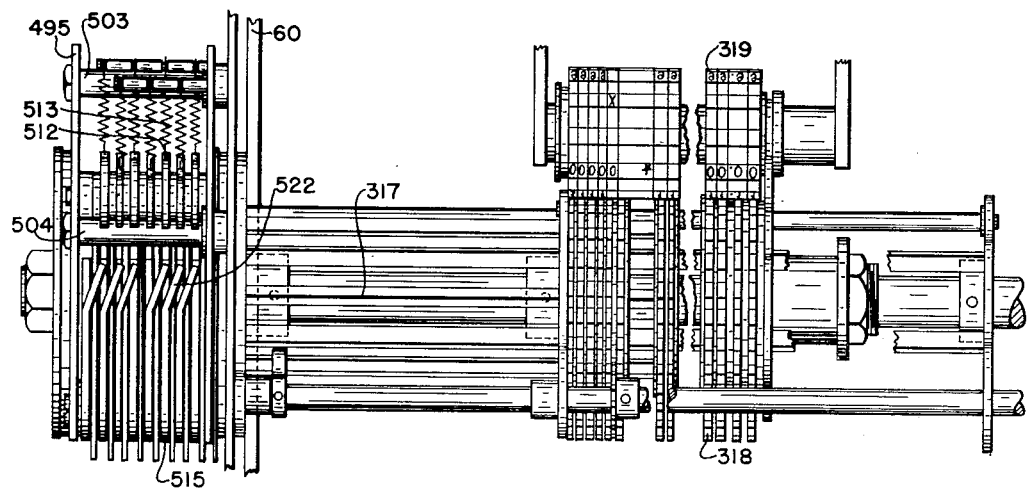
Fig. 5 is a front elevation of a portion of the printing mechanism showing the type wheels and the mechanism for controlling the printing of zeros in connection with the amounts and identifying numbers.

The internal-external gear mechanism for transmitting the positioning of the differential mechanism to the type wheels, shown in Figs. 1, 4 and 5, is of the type fully illustrated and described in the patent to Walter J. Kreider, No. 1,693,279, dated November 27, 1928.

From the above description it can be clearly seen that the type wheel 319 associated with the $10.00 bank of keys is differentially positioned in accordance with the value of the key depressed, through the differential mechanism, the beam 261, and linkage from the beam to the segment 496, and thence through the internal-external gear drive mechanism shown in Figs. 4 and 5.

ZERO ELIMINATION MECHANISM

Referring to Fig. 2, the $1 and the $10 rows of keys 190, the $100 row of keys 191, and the four rows of identifying number printing keys 192 are provided with zero elimination mechanism for preventing the printing of zeros when no keys are depressed in the higher orders, and for permitting the printing of zeros in the lower orders when a key is depressed in the adjacent higher order. The units of cents row of keys and the tens of cents row of keys are not provided with zero elimination mechanism as it is desirable that the zeros print in these two orders at all times.

The zero elimination mechanism for the $10 amount bank 191 is shown in Fig. 4, and inasmuch as the zero elimination mechanism is substantially duplicated in the other banks where it is used, it is believed that a description of the mechanism shown herewith will suffice for all.

It will be recalled that the keys 191 for the $10.00 bank have associated therewith a differential mechanism and a driving connection from the differential to the $10.00 type wheel, which mechansims are shown in Figs. 1, 4 and 5. The driving connection to the type wheels involves the segment 496 and the internal-external drive gear 497.

When the segment 496 and the gear 497 are in zero position, as shown in Fig. 4, a wide space in the periphery of said segment cooperates with a wide tooth 498 on the gear segment 497. The wide space in the segment 496 permits the gear 497 to be moved counterclockwise independently of the segment, the wide tooth 498 therein passing out of mesh with the wide space in the segment. When the gear 497 is moved out of zero position for the purpose of eliminating the printing of zeros, the periphery of the wide tooth 498 moves into the path of a large tooth 499 on the segment 496 to block counterclockwise movement of said segment, and thereby lock said segment in zero position.

The gear 497 has a shoulder 500 (Fig. 4) arranged to be engaged by a bent-over ear 501 on a plate 502 mounted for oscillating movement around the axis of the gear 497 by means of two curved slots therein, in cooperation with studs 503 and 504 secured in a plate 467 secured to the frame 60 (Fig. 5). A link 505 pivotally connects the plate 502 to a cam lever 506, free on a stud 507 in the frame 60. The lever 506 carries a roller 508 which engages a camming groove 509 in a cam 510 secured to the main cam shaft 130. The cam groove 509 oscillates the lever 506 and the plate 502 first counterclockwise and then clockwise back to normal position an invariable extent each machine operation to provide a constant displacement device for operating the zero elimination mechanism.

The plate 502 carries a stud 511 upon which is pivoted a pawl 512 urged counterclockwise by a spring 513 to normally maintain a rounded projection 514 thereof in contact with the lefthand surface of a zero elimination pawl 515. The pawl 515 is rotatably supported by a stationary stud 516 in the plate 467 and said pawl is urged counter-clockwise by a torsion spring 517 to normally maintain an extension 518 thereof in contact with a camming surface 519 on the periphery of the gear 497.

When no key is depressed in the $10 amount bank the segment 496 and gear 497 remain in zero position, as here shown. Counterclockwise movement of the lever 506 and the plate 502 under influence of the cam groove 509 causes the rounded extension 514 of the pawl 512 to ride away from the inclined surface of the pawl 515 and permit the spring 513 to engage the tooth of the pawl 512 with the left-hand shoulder of a notch 520 in the periphery of the gear 497. After the pawl 512 engages the notch 520, it moves the gear 497 and the type wheel 319 for the $10 order amount bank counterclockwise and clockwise, respectively (Figs. 1 and 4) in unison therewith from zero position to a position beyond zero, which is blank, or a non-printing position, to eliminate the printing of zero in this particular order.

When the gear 497 is in non-printing position the periphery of the wide tooth 498 is in the path of the tooth 499 of the segment 496 to retain said segment in zero position and a hook 521 on the gear 497 moves over the extension 518 to lock the pawl 515 in ineffective position, as here shown. Return movement clockwise of the lever 506 and the plate 502 causes the ear 501 to engage the shoulder 500 to return the gear 497 to zero or normal position, as here shown, after the printing mechanism has functioned.

When one of the keys 191 in the $10.00 order amount bank is depressed, the segment 496, under the influence of the differential mechanism for said amount bank, moves counterclockwise out of zero position carrying the gear 497 clockwise in unison with it. When the gear 497 moves away from zero position while traveling in a clockwise direction, the camming surface 519 thereon, in cooperation with the extension 518 of the pawl 515, rocks said pawl counterclockwise against the action of the spring 517. As the pawl 515 moves counterclockwise under influence of the camming surface 519, said pawl in cooperation with the extension 514 rocks the pawl 512 clockwise against the action of the spring 513 to move and retain the tooth thereof away from the periphery of the gear 497 so that said tooth will be held out of engagement with the notch 520 during oscillating movement of the plate 502, as explained above. The pawl 515 for the $10 amount bank has a bent-over projection 522 which overlies the pawl 515 for the next lower order (Fig. 5). Consequently counterclockwise movement of the pawl 515 for the $10.00 order, under influence of the camming surface 519, rocks the pawl 515 for the next lower order counterclockwise in unison therewith to rock and retain the tooth of the pawl 512 for said lower order out of the path of the notch 520 of the gear 497 for said lower order so that said gear and the printing mechanism positioned thereby will remain in zero position, as it is desirable to record the zeros in the lower order when a key in a higher order is depressed.

As previously explained, the $1.00 and the $100 amount banks and the overflow bank for the $100 bank, and all four of the identifying ledger number banks 192 have a zero elimination mechanism, which is substantially identical with that shown in Fig. 4, and which functions exactly like said zero elimination mechanism for controlling the printing of zeros in their respective banks. However, only one plate 502 is provided, the ear 501 of which extends over all of the gears 497, so that when this plate is restored the ear 501 will engage the shoulders 500 of all of the gears 497 which were moved to their respective nonprint positions and restore them to normal positions. The units and tens of cents banks 190 are not provided with zero elimination mechanism, as it is desirable that the zeros of these banks print at all times.

A plate 495 (Fig. 5) secured to the threaded ends of the studs 503 and 504, assists the plate 467 in holding the zero elimination mechanism in place. The plate 495 has a curved slot (not shown herein), engaged by a roller on the stud 511 to assist in guiding the plate 502 in its oscillating movement.

While the form of mechanism shown and described herein is admirably adapted to fulfill the objects primarily stated, it is to be understood that it is not intended to confine the invention to the one form or embodiment shown herein, for it is susceptible of embodiment in various forms all coming within the scope of the claims which follow.

What is claimed is:

1. In a machine of the character described, the combination of a type carrier for recording numerals; a segmental gear operatively connected to the type carrier, said segmental gear having a shoulder thereon; differentially adjustable means coacting with the segmental gear to move the type carrier to various positions, including zero position; a device having an invariable movement each machine operation; an element connected to and operated by the device; a control surface on the segmental gear; and a member coacting with the control surface and the element, said member effective when the segmental gear is positioned at zero by the differentially adjustable means to permit the element to engage the shoulder and move said gear and the type carrier independently of the differentially adjustable means to a position beyond the operating scope of said differentially adjustable means, to locate said type carrier in a non-recording position, said member effective when the segmental gear is positioned in other than zero position by the differentially adjustable means, to move and retain the element out of coacting relationship with the shoulder.

2. In a machine of the class described, the combination of type carriers constructed and arranged to record numerals; means, including segmental gears, operatively connected to the type carriers; differentially adjustable means coacting with the segmental gears to move the type carriers to various numerical positions including zero position; a device having an invariable movement each machine operation; elements connected to and operated by the device and coacting with the segmental gears; means actuated and controlled by the segmental gears and coacting with the elements, said means effective, when said segmental gears and the type carriers are positioned in zero recording position, to permit said elements to coact with and move said segmental gears and said type carriers independently of the differentially adjustable means to position said type carriers in non-recording position, said means effective when the segmental gears and the type carriers are positioned in other than zero recording position to move and retain the elements out of coacting relationship with said segmental gears; and means connected to and operating in unison with the device and coacting with the segmental gears, to restore said segmental gears and the type carriers from non-recording position to zero recording position, after numeral recording has been effected, to in turn cause the means actuated and controlled by the segmental gears to restore the elements into coacting relationship with said segmental gears.

3. In a machine of the class described, constructed and arranged to record numerals, the combination of a numeral recording type carrier; means, including a segmental gear, operatively connected to the type carrier; differentially adjustable means coacting with the segmental gear to move the type carrier to various numeral recording positions including zero recording position; two shoulders formed on the segmental gear; a control surface formed on the segmental gear; a device having an invariable movement each machine operation; an element connected to and operating in unison with the device; yieldable means normally effective to urge the element into the path of one of the shoulders; a member actuated by the control surface and coacting with the element, when the segmental gear is positioned at zero, to permit the element to engage the one shoulder under influence of the yieldable means and move said segmental gear and the type carrier independently of the differentially adjustable means to a position beyond the scope of operation of said differentially adjustable means to locate said type carrier in a non-recording position, said member actuated by the control surface and coacting with the element, when the segmental gear is moved to other than zero position, to move and retain said element out of coacting relationship with the one shoulder; and means connected to and operating in unison with the device to engage the other shoulder and restore the segmental gear and type carrier from non-recording position to zero position, to in turn cause the member to restore the element into the path of the one shoulder.

4. In a zero printing control mechanism for accounting machines, the combination of a numeral printing type carrier; a segmental gear operatively connected to the type carrier; a differentially adjustable means; means connected to and positioned by the differentially adjustable means and normally coacting with the segmental gear to position it and the type carrier in various numeral printing positions, including zero printing position; two shoulders on the segmental gear; a camming surface on the segmental gear;

a device having an invariable movement each machine operation; an element connected to and operating in unison with the device; yieldable means to urge the element into the path of one of the shoulders; a member actuated by the camming surface and coacting with the element, when the segmental gear and the type carrier are located in zero printing position, to cause said element to engage the one shoulder, under influence of the yieldable means, and move said segmental gear independently of and out of coacting relationship with the means connected to and positioned by the differentially adjustable means, to cause said segmental gear to move the type carrier to a non-printing position, said member actuated by the camming surface and coacting with the element, when the segmental gear and the type carrier are in other than zero printing position, to move and retain said element out of the path of the one shoulder to prevent additional movement of said segmental gear and the type carrier; and means connected to and operating in unison with the device to engage the other shoulder and restore the segmental gear and the type carrier to zero printing position, after printing has been effected, to in turn cause the member to restore the element into the path of the one shoulder.

5. In a machine of the class described, the combination of a type carrier for printing numerals; a segmental gear operatively connected to the type carrier; differential means including a gear sector normally meshing with the segmental gear to position said segmental gear and the type carrier in various numeral-printing positions including zero printing position; a device having an invariable movement each machine operation; an element mounted on and operated by the device and coacting with the segmental gear when it and the type carrier are positioned in zero printing position to move said segmental gear out of mesh with the gear sector to position said segmental gear and the type carrier in a non-printing position, said device effective to restore said segmental gear into mesh with the gear sector after printing has been effected; and control means actuated by the segmental gear when it and the type carrier are moved to other printing positions than zero printing position and coacting with the element to render said element ineffective to coact with said segmental gear.

6. In a machine of the class described, having a plurality of denominational orders and a numeral-printing type carrier for each order, the combination of a segmental gear for each order operatively connected to the corresponding type carrier; differentially adjustable means for each order coacting with the segmental gears to position them and the type carriers in various numeral-printing positions including zero printing position; zero stop means for each order coacting with the differentially adjustable means to position the segmental gears and the type carriers in zero printing position; numeral keys for each order to render the corresponding zero stop means ineffective and to coact with the differentially adjustable means to position the segmental gears and the type carriers in various numeral-printing positions; a device having an invariable movement each machine operation; elements mounted on and operable by the device and coacting with the corresponding segmental gears when they are located in zero position to move said segmental gears and the corresponding type carriers to a non-printing position; means operated by the device and coacting with the segmental gears to restore them and the corresponding type carriers from non-printing position to zero printing position, after printing has been completed; a control surface on each of the segmental gears; a member for each denominational order constructed and arranged to be actuated by the corresponding control surfaces when the segmental gears are moved to other printing positions than zero printing positions, said members when actuated coacting with the corresponding elements to render them ineffective to cooperate with the corresponding segmental gears; and connections between the members, said connections effective when a higher order member is actuated by the corresponding control surface to simultaneously actuate the lower order members to cause the corresponding lower order segmental gears and type carriers to be retained in zero printing position.

FREDERICK GANTNER.
MARY KLOSTERMAN,
Executrix of the Estate of Joseph J. Klosterman, Deceased.
JOHN H. MORE,
Administrator of the Estate of John B. Geers, Deceased.

REFERENCES CITED

The following references are of record in the file of this patent:

UNITED STATES PATENTS

| Number | Name | Date |
| --- | --- | --- |
| 1,330,278 | Palmer | Feb. 10, 1920 |
| 1,790,790 | Breitling | Feb. 3, 1931 |
| 1,812,161 | Mapel | June 30, 1931 |
| 1,951,682 | Varren | Mar. 20, 1934 |
| 2,039,925 | Ovaitt | May 5, 1936 |
| 2,092,852 | Payne | Sept. 14, 1937 |
| 2,109,309 | Breitling | Feb. 22, 1938 |
| 2,110,903 | Breitling | Mar. 15, 1938 |
| 2,141,333 | Arnold | Dec. 27, 1938 |
| 2,411,050 | Mehan | Nov. 12, 1946 |